(No Model.) 2 Sheets—Sheet 1.
W. T. MESSINGER.
FLUID DISCHARGING APPARATUS.
No. 517,550. Patented Apr. 3, 1894.
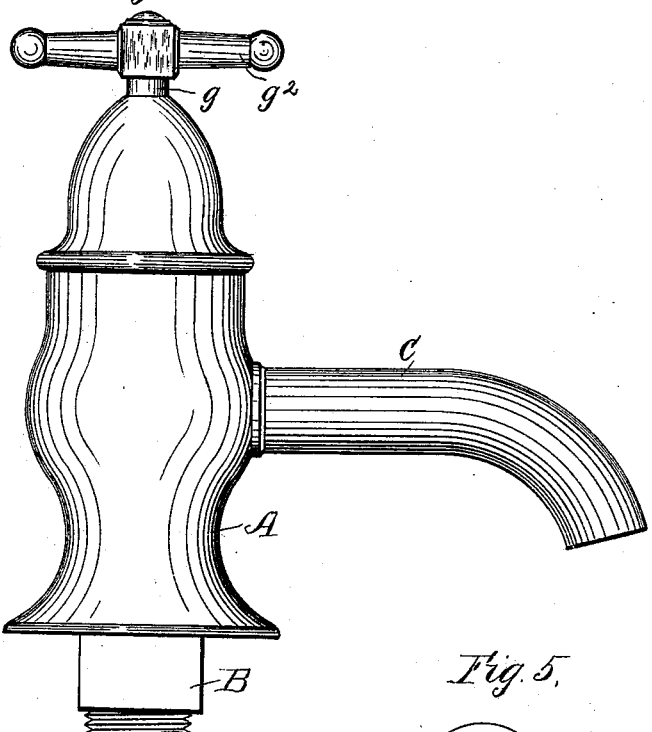
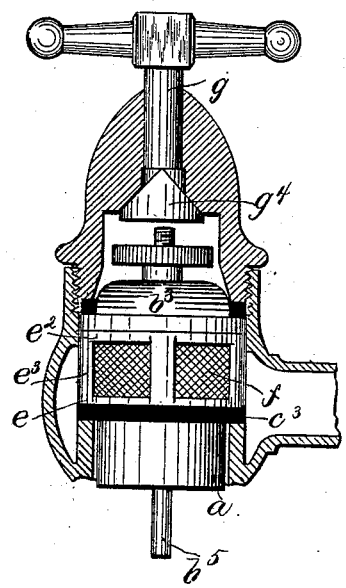
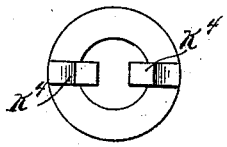
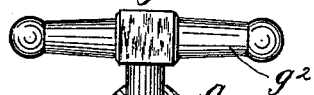
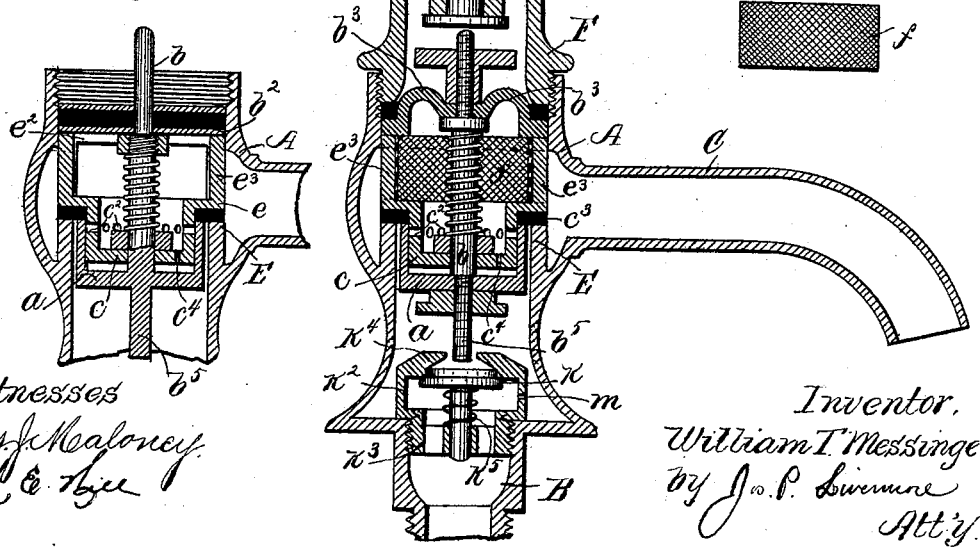
Witnesses
Jas. J. Maloney
M. E. Hill
Inventor,
William T. Messinger.
by Jno. P. Livermore
Att'y (No Model.) 2 Sheets—Sheet 2.
W. T. MESSINGER.
FLUID DISCHARGING APPARATUS.

No. 517,550. Patented Apr. 3, 1894.

Witnesses.
Jas. J. Maloney
M. S. Hill

Inventor.
William T. Messinger.
by Jo. P. Livermore
Att'y

UNITED STATES PATENT OFFICE.

WILLIAM T. MESSINGER, OF BOSTON, MASSACHUSETTS.

FLUID-DISCHARGING APPARATUS.

SPECIFICATION forming part of Letters Patent No. 517,550, dated April 3, 1894.

Application filed May 2, 1891. Serial No. 391,322. (No model.)

*To all whom it may concern:*

Be it known that I, WILLIAM T. MESSINGER, of Boston, county of Suffolk, State of Massachusetts, have invented an Improvement in Fluid-Discharging Apparatus, of which the following description, in connection with the accompanying drawings, is a specification, like letters on the drawings representing like parts.

My invention relates to a fluid discharging apparatus or faucet and consists mainly in novel features of construction of the valve that governs the flow of fluid, the object being to produce a simple and inexpensive but efficient device for controlling the flow of the fluid and also for filtering the fluid which device can be readily removed for repairs or for cleaning the filter and which in closing stops the flow of fluid gradually and thus prevents concussion or water hammer in the pipes.

The valve proper is in the form of a cylinder open at one end and closed at the other so as to form a cup, which moves with a working fit on a cylindrical seat-piece at the base of which is a packing annulus or seat proper against which the edge of the cup-shaped valve rests when closed, thus making a tight joint through which the fluid cannot pass. The seat piece works in the valve as a piston and these parts co-operate together in such manner that a portion of the fluid enters and is trapped between them when the valve is open to permit the flow of fluid through the apparatus, and the said entrapped fluid has to be displaced in the closing of the valve and acts as a cushion to prevent such closing from taking place suddenly and thus prevents water hammer from taking place. The valve seat may be made as a part of the valve shell or faucet but in the preferable construction the valve seat and valve are made as parts of a valve chamber separate and detachable from the main body or shell of the faucet which latter requires but little fitting or machine work.

In the construction in which the working parts, including the valve proper and its seat are made detachable from the body of the instrument the latter is preferably provided with an auxiliary valve arranged to work in connection with the main valve, and properly constructed to prevent concussion or water hammer.

Figure 7:
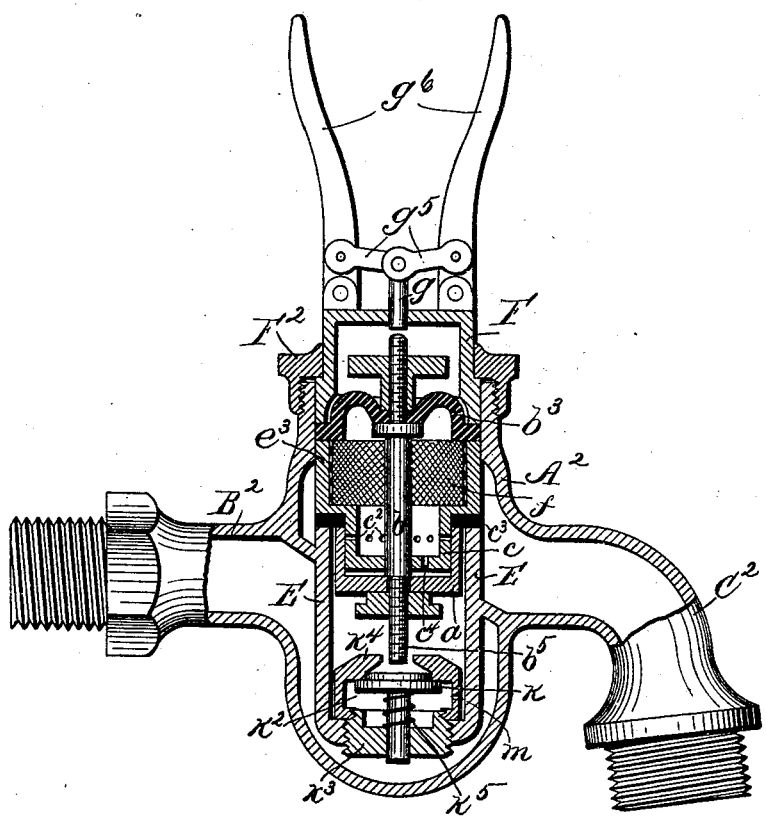

Figure 1 is a side elevation of a fluid discharging instrument embodying this invention being shown as of the form used for a basin faucet; Fig. 2 a longitudinal vertical section thereof; Fig. 3 a sectional detail showing a modified construction of some of the parts; Fig. 4 a sectional detail showing a modification of the construction of the handle and stem by which the valve is operated; Fig. 5 a plan view of the auxiliary valve detached; Fig. 6 a side elevation of the strainer which may be employed in connection with the main valve chamber; Fig. 7 a sectional view showing the apparatus employed in a faucet or valve body of a different form from that represented in Figs. 1 and 2, and Fig. 8 a side elevation of the removable fluid controlling mechanism or valve chamber comprising the valve, valve seat, and co-operating parts.

The valve or fluid controlling apparatus forming the subject of this invention may be employed in connection with faucets or valve bodies of various shapes according to the purpose for which they are intended, being shown in Figs. 1 and 2 as used in connection with a valve body or shell A in the form of an upright stand having an inlet B at its lower end and a lateral outlet or delivery spout C while in the construction shown in Fig. 7 the shell $A^2$ has a lateral inlet $B^2$ which is opposite the outlet or spout $C^2$ instead of at right angles thereto as shown in Figs. 1 and 2.

In the modified constructions shown in the several figures the valve and its seat have the construction and mode of operation that has just been described, the said modifications relating mainly to the devices for operating the valve and to the relation of the valve and its operating device to the shell or body of the valve proper.

The valve proper $a$ is in the form of a cylinder open at one end and closed at the other and is provided with a stem $b$ by which it is moved longitudinally to open and close the ports or passages through which the fluid passes when the valve is open. The said cylindrical or cup-shaped valve $a$ has a working fit upon a seat piece $c$ which is also cylindrical and open at one end and closed at the other, its cylindrical wall being provided with suitable ports or passages $c^2$ through which the fluid may flow when the said ports are uncovered by the valve proper $a$ which has a movement sufficient to cover or uncover the said ports. The said seat piece $c$ is provided around its base with an annulus $c^3$ which may be of packing material and which constitutes the seat proper against which the edge of the open end of the valve $a$ rests when the said valve is closed, the engagement between the open end of the valve and the annulus $c^3$ making a tight joint to prevent passage of fluid from inside to the outside of the valve or the opposite, and thus effectually preventing flow of fluid through the ports $c^2$ without depending upon a tight fit between the cylindrical walls of the seat piece $c$ and valve proper $a$.

In the opening and closing movement of the valve $a$ the seat piece $c$ works within it like a piston, and if fluid is permitted to enter the recess or space at the interior of the valve, between it and the seat piece the said fluid will act as a cushion to resist the closing movement of the valve which can only come to its seat by expelling the fluid from said space. In order to provide for the admission of fluid into the said space and also for its gradual expulsion therefrom in the closing movement of the valve, a small opening or vent is provided as shown at $c^4$ through the seat piece through which opening the fluid passes when the valve is opened thus entering the space between the valve and seat piece so that it must be expelled from said space again before the valve can come to its seat. The vent $c^4$ is made small enough to cause the fluid trapped in the recess of the valve to afford an efficient resistance to the closing of the valve.

In the construction shown in Fig. 9 the valve stem $b$ passes through packing disks $b^2$ and is operated by a hand lever $g^{50}$ which is raised to open the valve, the spring $d$ closing the same as soon as the handle $g^5$ is released but the fluid cushion inside the valve preventing a sufficiently sudden closure to cause shock or water hammer.

In the constructions represented in the other figures the valve and its seat have the same construction and mode of operation as has just been described, and are marked with the same reference letters, the construction in the other figures differing from that already described mainly in the relation of the seat piece and auxiliary devices controlling the working of the valve, to the body or shell proper.

Figure 8:
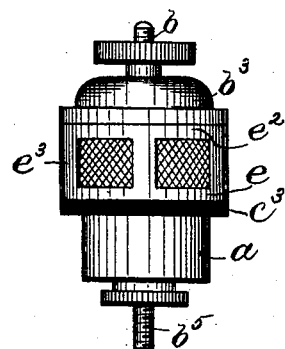

When the invention is to be embodied in a faucet it is desirable to have the working parts separate from the body of the faucet, as in that case the machine work and finish may be more readily performed on the working parts and the body or shell requires to have but little machine work performed upon it. This construction is best shown in Fig. 8 in which the detachable working parts are shown removed from the body of the faucet and in Figs. 2 and 7 in which said working parts are shown in longitudinal section in working position. In this construction the seat piece $c$ is made at the base of a frame or chamber composed of two rings $e$, $e^2$, connected by arms $e^3$ so as to afford a lateral opening between the said rings through which the fluid that passes through the ports $c^2$ may escape. Above the ring $e^2$ is supported a packing for the valve stem $b$ which in this construction passes through the chamber formed at the interior of and above the seat piece, said packing being shown in Figs. 2, 4, 7, and 8 as a flexible diaphragm $b^3$ and in Fig. 3, as a disk $b^2$ through which the valve stem works. The annular open frame or chamber composed of the rings $e$, $e^2$, and arms $e^3$ is thus interposed between the flange of the packing diaphragm or disk, and the ring $c^3$ upon the edge of which the valve $a$ seats, and the shell of the faucet is provided with a seat E Figs. 2 and 7, between which and a suitable follower or clamping piece F constituting the cap of the valve shell, the entire valve mechanism shown in Fig. 8 is clamped, being thus interposed between the inlet and outlet openings of the shell, of the faucet, so that the valve $a$ controls the flow of fluid from said inlet to the said outlet opening through the ports $c^2$.

When the valve $a$ is closed the fluid entering through the inlet opening B Fig. 2, or $B^2$ Fig. 7, is stopped by the said valve and the seat ring $c^3$ which packs the joint between the valve mechanism and the faucet shell at E and when the said valve is open the said fluid is permitted to flow through the ports $c^2$ into the interior of the seat piece $c$ and thus into the chamber between the rings $e$, $e^2$, and arms $e^3$ the openings between which communicate with the discharge spout C Fig. 2, or $C^2$ Fig. 7, of the faucet. The space between the said rings $e$, $e^2$, and arms $e^3$, may be provided with a foraminous wall or strainer $f$ through the interstices of which fluid must pass before issuing from the outlet of the faucet thus enabling the liquid to be effectually cleared or filtered without any additional instrument for that purpose, the space between the rings $e$, $e^2$, and within the arms $e^3$, affording an effectual filtering chamber with sufficient area of filtering surface for effective action.

The faucet is provided with any suitable or usual means for operating the valve stem $b$ from the outside. As shown in Fig. 2, the operating device consists of a screw threaded rod or stem $g$ provided with a cross piece or handle $g^2$ and working in a threaded opening in the cap piece F of the faucet shell, said rod engaging with the end of the stem $b$, above the packing disk or diaphragm $b^3$ so that when the handle $g^2$ is turned it depresses the valve stem and valve, causing the latter to uncover the ports $c^2$, and permit the fluid to flow to the interior of the seat piece and thence out through the strainer into the spout or outlet passage of the faucet.

In the construction shown in Fig. 4 the rod $g$ is operated by a double cam $g^4$ instead of a screw thread to depress the valve stem and open the valve.

In the construction shown in Fig. 7 the rod $g$ is operated by links $g^5$ and finger-levers $g^6$ the effect being the same in all cases and it being immaterial what specific device is used to operate the valve stem.

In the construction shown in Fig. 7 the cap piece F of the faucet is fastened to the body of the faucet by an annular nut $F^2$ after the manner of a coupling ring, while in the construction shown in Figs. 1 and 2, the said cap piece screws directly into the body of the faucet and so as to clamp the removable valve chamber and working parts connected therewith in proper position in the shell.

The faucets shown in Figs. 2 and 7 are represented as provided with an additional valve $k$ auxiliary to the main valve, the said valve $k$ being inclosed in a valve chamber $k^2$ one end $k^3$ of which screws into the body of the faucet the said chamber being shown as provided with projections $k^4$ see Fig. 5, to facilitate the operation of screwing it into place the said projections being adapted to be engaged by a suitable wrench or pair of pliers. The chamber $k^2$ is made in two parts for the purpose of introducing the valve $k$ the said parts being securely fastened together after the valve is introduced by any suitable joint. The two pieces $k^2$, $k^3$, are represented fastened together by screw thread and when so fastened the joint is secured by solder or by a cross pin or otherwise so as to prevent the two parts from separating in the act of screwing the part $k^3$ into the body of the faucet or unscrewing it therefrom. The valve $k$ is shown as acted upon by a light spring $k^5$ that tends to close it, and the pressure of the fluid also tends to close it. The said valve is opened by a projecting portion $b^5$ of the stem of the main valve $a$.

The auxiliary valve $k$ is adapted to co-operate with the main valve in preventing water hammer as follows:—The chamber $k^2$ is provided with a small passage or vent $m$ through which fluid can flow when the valve $k$ is closed so that the said valve $k$ does not form a complete barrier to the flow of the fluid. The portion $b^5$ of the main valve stem that operates the auxiliary valve is so arranged that in the movement by which the main valve $a$ is opened the auxiliary valve is not engaged and unseated until the main valve has made some movement and has begun to open or fully opened the ports controlled by it. At the time when the main valve ports are opened while the auxiliary valve is still seated or closed, the fluid can pass through the vent passage $m$ from the auxiliary valve chamber and will be delivered from the faucet up to the capacity of said passage $m$ which is commonly sufficient to give a moderate flow through the discharge pipe of the faucet. Then a further movement of the main valve, causes the auxiliary valve to be unseated so as to afford a sufficient opening for the discharge of fluid up to the full capacity of the faucet.

In the operation of closing the faucet the main valve which is cushioned in its closing movement first permits the auxiliary valve to close which takes place as or about as the main valve begins to close the ports $c^2$ controlled by it, but owing to the passage $m$ through the auxiliary valve chamber the closure of the auxiliary valve $k$ does not completely arrest the column of fluid below it and consequently produces no shock in the pipes.

If the main valve were not cushioned and retarded in its closing movement the auxiliary valve and valve chamber having the vent passage $m$ as described, would effectually prevent water hammer in the pipes, since even if the valve $k$ closed suddenly it would not completely arrest the flow of fluid owing to the vent passage $m$ and to the fact that the outlet would be unobstructed beyond said vent-passage for an appreciable time after the valve $k$ was closed.

The vent passage $m$ should be of such size as to permit only such flow of fluid as would be readily discharged through the spout C without producing an appreciable pressure in the faucet, so that the main valve chamber and co-operating parts can be removed from the faucet body without shutting off the water from the pipes, the auxiliary valve $k$ then preventing objectionable overflow of the fluid which will however remain running in small quantity through the passage $m$ and discharge from the outlet C.

Various modifications may be made in the construction of the apparatus without departing from the essential features of construction and operation, and several of such modifications in the minor details are represented some of which have been already mentioned.

In the construction shown in Figs. 2 and 3, a spring is employed acting upon a shoulder on the valve stem with a tendency to close the valve but in the construction shown in Fig. 7 the said spring is omitted, the elasticity of the packing diaphragm $b^3$ being sufficient to close the valve when the pressure by which it was opened is removed.

It will be seen that substantially all the fitting requiring machine work is made in the parts that are comprised or connected with the removable valve chamber shown separately in Fig. 8, and that the main body or shell requires no machine work except the proper smoothing of the seat E against which the valve chamber is clamped and the cutting of screw threads to receive the removable cap F or nut by which the said cap is attached to the said shell, the screw thread for the auxiliary valve chamber, and the screw thread by which the faucet is connected with the pipes if such kind of connection is used.

I claim—

1. The combination of the main shell or chamber of a fluid discharging apparatus, with the main valve controlling the flow of fluid therefrom, and the auxiliary valve acted upon by the fluid entering the shell which tends to close said auxiliary valve, said main valve cooperating with the auxiliary valve as described, opening the same when the main valve is opened and permitting the auxiliary valve to close when the main valve is closed, as and for the purpose described.

2. The chamber provided at one end with a cylindrical seat piece having lateral ports, and with a packing disk at its other end, combined with the cylindrical valve cooperating with said seat piece and controlling the said ports, and its stem passing through said packing disk, the said chamber having lateral openings between the seat piece and packing disk, substantially as described.

3. The chamber provided at one end with a cylindrical seat piece having lateral ports and with a packing disk at its other end combined with the cylindrical valve cooperating with said seat piece and controlling the said ports, and its stem passing through said packing disk, and said chamber having lateral openings between the seat piece and packing disk, and a cylindrical strainer confined therein by said packing disk, substantially as described.

4. The combination of the main shell or chamber of a fluid discharging apparatus, with the main valve controlling the flow of fluid therefrom, and the auxiliary valve chamber vented as described and the auxiliary valve therein, constantly exposed to the pressure of the fluid entering the shell, which tends to close the said auxiliary valve, said main valve cooperating with the auxiliary valve as described, opening the said valve when the main valve is opened and permitting the auxiliary valve to close when the main valve is closed, substantially as and for the purpose described.

5. The combination of the main shell of the faucet provided with a seat as E with a removable valve chamber having an annulus that engages with said seat, and the valve seating on said annulus, a packing disk at the opposite end of said chamber from said annulus, and a removable cap piece or cover for the valve shell between which and the seat in the valve shell the removable chamber is secured, substantially as described.

In testimony whereof I have signed my name to this specification in the presence of two subscribing witnesses.

WILLIAM T. MESSINGER.

Witnesses:
   JOS. P. LIVERMORE,
   JAS. J. MALONEY.